(12) United States Patent
Sullivan et al.

(10) Patent No.: US 10,207,820 B2
(45) Date of Patent: Feb. 19, 2019

(54) SYSTEMS FOR TRANSPORTING, DEPLOYING, AND DOCKING UNMANNED AERIAL VEHICLES MOUNTABLE ON A GROUND VEHICLE

(71) Applicant: Toyota Motor Engineering & Manufacturing North America, Inc., Erlanger, KY (US)

(72) Inventors: Richard M. Sullivan, South Lyon, MI (US); Paxton S. Williams, Milan, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 59 days.

(21) Appl. No.: 15/202,568

(22) Filed: Jul. 5, 2016

(65) Prior Publication Data

US 2018/0009549 A1    Jan. 11, 2018

(51) Int. Cl.
| | |
|---|---|
| *B64C 39/02* | (2006.01) |
| *B64C 19/00* | (2006.01) |
| *B64F 1/02* | (2006.01) |
| *B64F 1/00* | (2006.01) |
| *B64F 3/00* | (2006.01) |
| *B64F 1/22* | (2006.01) |
| *B64F 1/36* | (2017.01) |

(52) U.S. Cl.
CPC .............. *B64F 1/22* (2013.01); *B64C 39/022* (2013.01); *B64C 39/024* (2013.01); *B64F 1/02* (2013.01); *B64F 1/362* (2013.01); *B64F 3/00* (2013.01); *B64C 2201/024* (2013.01); *B64C 2201/127* (2013.01)

(58) Field of Classification Search
None
See application file for complete search history.

(56) References Cited

U.S. PATENT DOCUMENTS

| | | | | | |
|---|---|---|---|---|---|
| 3,059,927 | A | * | 10/1962 | Kamp | A63B 67/04 273/317.4 |
| 4,123,020 | A | * | 10/1978 | Korsak | B64F 1/00 244/115 |
| D385,680 | S | * | 10/1997 | Cacciola | D99/29 |
| 5,676,090 | A | * | 10/1997 | Cannady, Jr. | A01K 1/0107 119/165 |
| D497,465 | S | * | 10/2004 | Hradisky | D99/29 |
| D501,594 | S | * | 2/2005 | Taylor | D99/29 |
| 8,930,044 | B1 | * | 1/2015 | Peeters | B64C 19/00 701/2 |
| 9,056,676 | B1 | * | 6/2015 | Wang | B64F 1/00 |
| 9,429,953 | B1 | * | 8/2016 | Miller | G05D 1/0676 |

(Continued)

*Primary Examiner* — Navid Ziaeianmehdizadeh
(74) *Attorney, Agent, or Firm* — Christopher G. Darrow; Darrow Mustafa PC

(57) ABSTRACT

A housing for a ground vehicle-mountable aerial vehicle is provided. The housing includes a base portion defining a cavity and an opening leading into the cavity. The cavity is structured to receive an unmanned aerial vehicle therein. The cavity is configured so as to open upwardly when the housing is mounted on the vehicle. The housing also includes a drafting wall structured to extend from the base portion at a location forward of at least a portion of the cavity when the housing is mounted on the ground vehicle.

9 Claims, 11 Drawing Sheets

(56) References Cited

U.S. PATENT DOCUMENTS

| | | | |
|---|---|---|---|
| 9,704,409 B2* | 7/2017 | Prakash | B64C 39/024 |
| 2004/0167682 A1* | 8/2004 | Beck | B60K 17/046 |
| | | | 701/3 |
| 2007/0023568 A1* | 2/2007 | Rom | B64C 39/024 |
| | | | 244/48 |
| 2008/0191091 A1* | 8/2008 | Hoisington | B64C 39/024 |
| | | | 244/110 F |
| 2009/0314883 A1* | 12/2009 | Arlton | B64C 39/024 |
| | | | 244/63 |
| 2010/0181424 A1* | 7/2010 | Goossen | F41H 13/0006 |
| | | | 244/110 F |
| 2011/0303789 A1* | 12/2011 | Miller | B64F 1/02 |
| | | | 244/110 C |
| 2011/0315810 A1* | 12/2011 | Petrov | B64C 39/022 |
| | | | 244/17.23 |
| 2013/0238168 A1* | 9/2013 | Reyes | B64C 39/024 |
| | | | 701/2 |
| 2014/0267627 A1* | 9/2014 | Freeman | G01S 17/023 |
| | | | 348/47 |
| 2014/0319272 A1* | 10/2014 | Casado Magana | B64F 1/04 |
| | | | 244/110 E |
| 2015/0076285 A1* | 3/2015 | Chavez, Jr. | B64F 1/02 |
| | | | 244/116 |
| 2015/0102154 A1* | 4/2015 | Duncan | B64C 39/022 |
| | | | 244/2 |
| 2015/0158513 A1 | 6/2015 | Costa et al. | |
| 2016/0016663 A1 | 1/2016 | Stanek et al. | |
| 2016/0221688 A1* | 8/2016 | Moore | B64F 1/00 |
| 2016/0251088 A1* | 9/2016 | Melish | B64F 1/02 |
| | | | 244/110 C |
| 2017/0096222 A1* | 4/2017 | Spinelli | B64C 39/024 |

\* cited by examiner

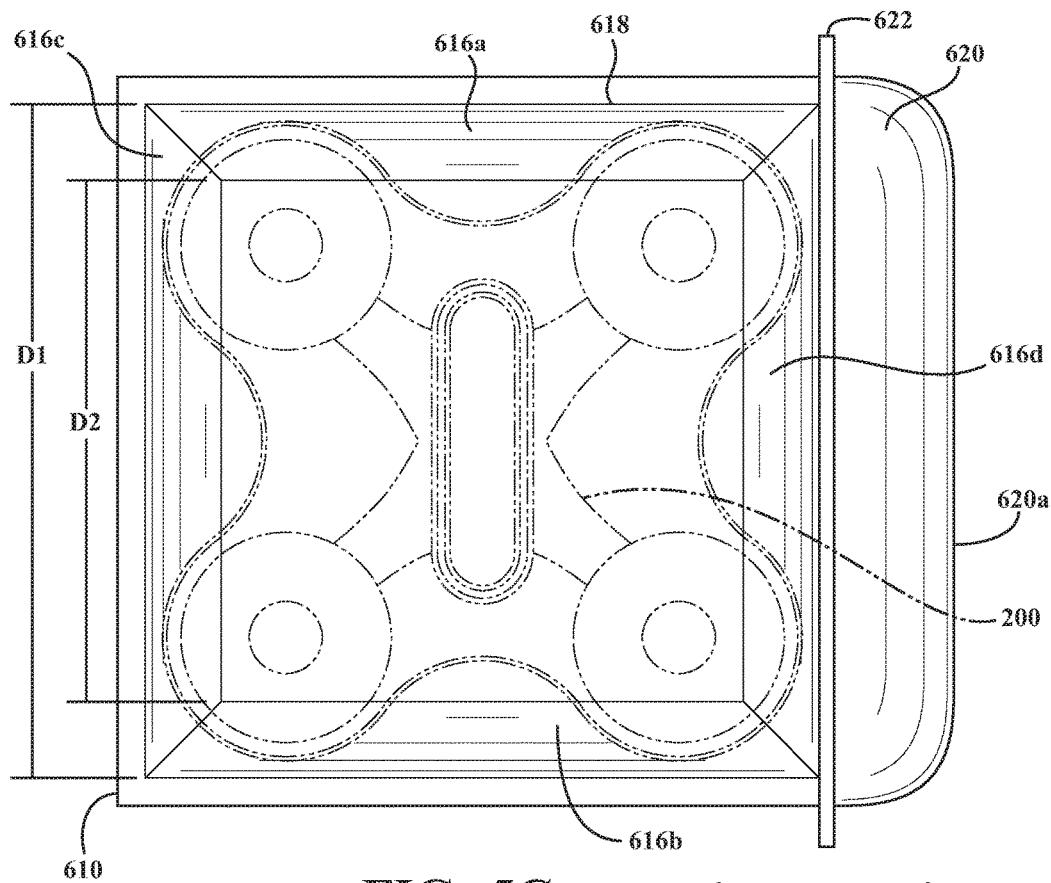
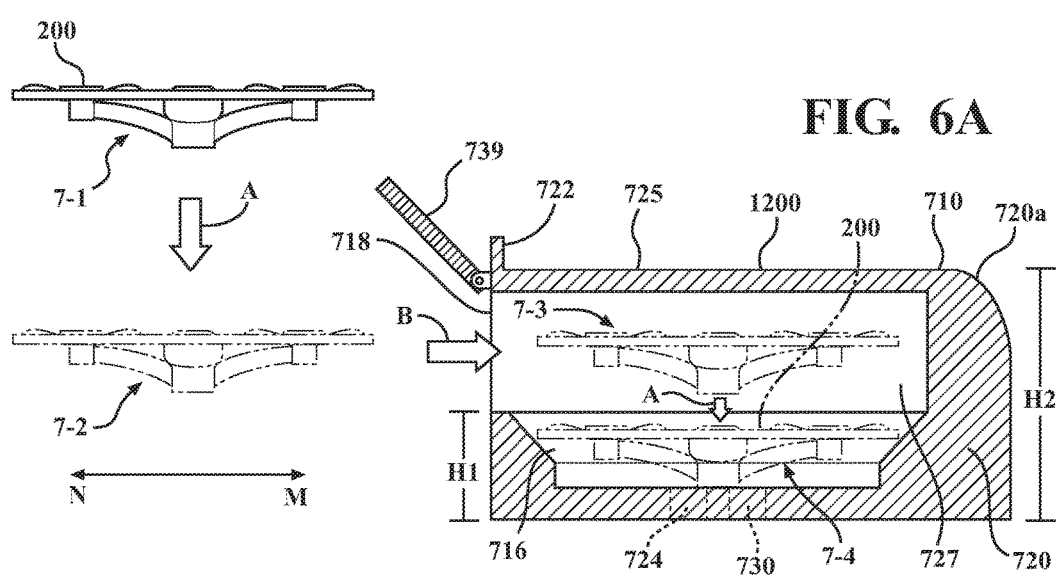

SYSTEMS FOR TRANSPORTING, DEPLOYING, AND DOCKING UNMANNED AERIAL VEHICLES MOUNTABLE ON A GROUND VEHICLE

TECHNICAL FIELD

The present invention relates to the operation and transportation of unmanned aerial vehicles which are transportable on and deployable from ground vehicles, to extend the sensor range of ground vehicle sensors.

BACKGROUND

Unmanned aerial vehicles (UAV's, or "drones") carrying a variety of sensors may be used to extend the ranges of ground-vehicle based sensors. The UAVs may gather and transmit information regarding conditions and events occurring in the path of a ground vehicle. However, it may be difficult to transport, deploy and dock an unmanned aerial vehicle from a ground vehicle, especially a ground vehicle moving at relatively high speeds.

SUMMARY

In one aspect of the embodiments described herein, a housing for an unmanned aerial vehicle is provided. The housing includes a base portion defining a cavity and an opening leading into the cavity. The cavity is structured to receive an unmanned aerial vehicle therein. The cavity is configured so as to open upwardly when the housing is mounted on a ground vehicle. The housing also includes a drafting wall structured to extend from the base portion at a location forward of at least a portion of the cavity when the housing is mounted on the ground vehicle.

In another aspect of the embodiments described herein, a housing for an unmanned aerial vehicle is provided. The housing includes a base portion defining a cavity and a first opening leading into the cavity. The cavity is structured to receive an unmanned aerial vehicle therein. A plurality of walls extends from the base portion and is structured to define a second opening configured to open toward a rear of a ground vehicle when the housing is mounted on the ground vehicle.

In another aspect of the embodiments described herein, a method for operating an unmanned aerial vehicle is provided. The method includes steps of: providing a housing including a cavity structured to receive the unmanned aerial vehicle therein, and a drafting wall residing at a location forward of at least a portion of the cavity when the housing is mounted on the ground vehicle; operating the unmanned aerial vehicle so as to maneuver the vehicle into a drafting position behind the drafting wall; and operating the unmanned aerial vehicle such that the aerial vehicle moves from the drafting position into the cavity.

BRIEF DESCRIPTION OF THE DRAWINGS

FIG. 5C is a schematic plan view of the unmanned aerial vehicle housing in FIG. 5A, showing a UAV in a docked position.

FIG. 6A is a schematic side cross-sectional view of an unmanned aerial vehicle housing in accordance with another embodiment described herein, and also illustrating another embodiment of a docking procedure for an unmanned aerial vehicle.

DETAILED DESCRIPTION

Embodiments described herein relate to the transportation, deployment, operation, and docking of an unmanned aerial vehicle (UAV) or "UAV" which is transportable and deployable from a ground vehicle for increasing the ranges of ground vehicle sensors. As used herein, the terms "aerial vehicle", "unmanned aerial vehicle", and "UAV" have the same meanings and will be used interchangeably. In one embodiment, a UAV may be transported in a housing that enables deployment and docking via an opening formed in the top of the housing. In another embodiment, the UAV may be transported in a housing that enables deployment and docking via an opening formed in the rear of the housing. A deployed UAV may also be secured to a version of the housing using a tether. The tether may be used to facilitate docking of the UAV in the housing. A UAV catching system may also be incorporated into an embodiment of a housing for capturing a UAV in flight.

Embodiments of the housing described herein enable the UAV to draft behind the housing during deployment and docking. As known, drafting is a technique where two vehicles or other moving objects are caused to align in a close group reducing the overall effect of drag due by enabling the following object to exploit the lead object's slipstream. Drafting may be used to reduce the wind resistance and turbulence which may impair drone flight control during docking and deployment. A drafting wall as described herein may be a wall dimensioned with respect to the size of the UAV, and positioned with respect to the portion of the cavity in which the UAV is docking with or deploying from, so as to enable the UAV to draft behind the wall during docking and deployment.

Figure 1:
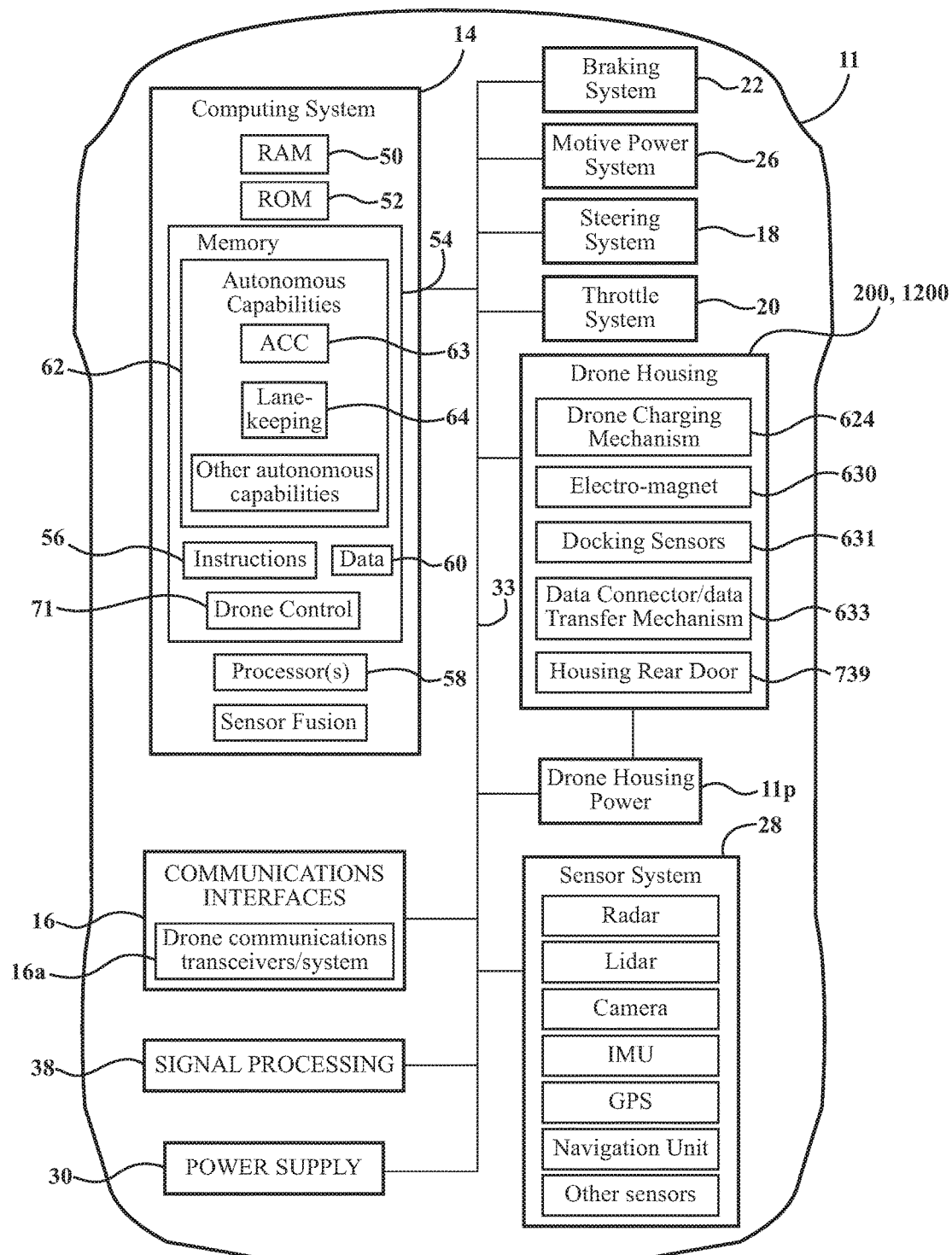
FIG. 1 is a functional block diagram illustrating a ground vehicle in accordance with an example embodiment.

FIG. 1 is a functional block diagram illustrating a ground vehicle 11 in accordance with an example embodiment. The ground vehicle 11 may be configured to operate fully or partially in an autonomous mode. While in an autonomous mode, the vehicle 11 may be configured to operate without human interaction.

The ground vehicle 11 may include various systems, subsystems and components in operative communication with each other, such as a sensor system or array 28, a computing system 14, one or more communications interfaces 16, a steering system 18, a throttle system 20, a braking system 22, a power supply 30, a motive power system 26, and other systems and components needed for operating the vehicle manually and/or autonomously as described herein. The ground vehicle 11 may include more or fewer subsystems and each subsystem could include multiple elements. Further, each of the subsystems and elements of ground vehicle 11 may be interconnected.

In a known manner, the vehicle sensors 28 provide data used by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or to any other element of the ground vehicle 11. In addition, information received from UAV sensors (described below) and other information may be communicated from the UAV to the vehicle computing system 14 for use in controlling the ground vehicle 11.

The sensor system 28 can include any suitable type of sensor. For example, the sensor system 28 may include a navigation unit such as a Global Positioning System (GPS), an inertial measurement unit (IMU), a RADAR unit, a laser rangefinder/LIDAR unit, and one or more cameras comprising devices configured to capture a plurality of images of the interior of the vehicle and/or an external environment of the ground vehicle 11. The camera(s) may be still cameras or video cameras. The IMU may incorporate any combination of sensors (e.g., accelerometers and gyroscopes) configured to sense position and orientation changes of the ground vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the ground vehicle 11. The navigation unit may also be configured to determine or plan a driving route from a given start point (for example, a current location of the vehicle) to a selected destination, using stored and/or available maps, in a manner known in the art.

The ground vehicle 11 may include a suitable signal processing means 38 for situations where a sensor output signal or other signal requires pre-processing prior to use by the computing system 14 or another vehicle system or element, or where a control signal sent from the computing system will require processing prior to use by vehicle actuatable sub-systems or sub-system components (for example, components of the steering system or throttle system) or by a UAV in communication with the ground vehicle 11. The signal processing means may be an analog-to-digital (A/D) converter or digital-to-analog (D/A) converter, for example.

FIG. 1 also illustrates a block diagram of an exemplary computing system according to one or more illustrative embodiments of the disclosure. The computing system 14 may have some or all of the elements shown in FIG. 1. In addition, the computing system 14 may also include additional components as needed or desired for particular applications.

The computing system 14 may be operatively connected to the other vehicle systems and elements and otherwise configured so as to affect control and operation of the ground vehicle 11 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously The computing system 14 may control the functioning of the ground vehicle 11 based on inputs and/or information received from various subsystems (e.g., motive power system 26, sensor system 28, steering system 18, etc.), from any of the communications interfaces 16, and/or from any other suitable source of information. The computing system may also incorporate a UAV control capability 71 for use in controlling some or all aspects of UAV operation, responsive to in formation received from the UAV, from ground vehicle sensors, and/or based on other information.

The computing system 14 may include one or more processors 58 (which could include at least one microprocessor) for controlling overall operation of the computing system 14 and associated components, and which executes instructions stored in a non-transitory computer readable medium, such as the memory 54. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other.

The computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the ground vehicle 11, including those described above in connection with FIG. 1. The memory 54 may contain additional instructions as well, including instructions to transmit information to, receive information from, control or otherwise interact with one or more of the vehicle systems and/or components described herein (for example, motive power system 26, sensor system 28, computing system 14, the communication interfaces 16, and the UAV housing).

The computing system 14 may be configured to coordinate control of the various actuatable vehicle systems and components so as to implement one or more autonomous vehicle control capabilities including autonomous driving assistance capabilities (generally designated 62). Examples of such driving assistance capabilities may include adaptive cruise control (ACC) 63 and lane-keeping 64. Computing system 14 may also incorporate a UAV control capability 71 for controlling an embodiment of a ground vehicle-mounted UAV as described herein. The computing system may be configured to exercise total control of the UAV (i.e., where all UAV commands are received from the ground vehicle 11), or the computing system may be configured to exercise partial control of the UAV (i.e., control for certain specific purposes or in specific situations). The UAV control capability 71 may be stored as an executable set of instructions in memory 54, for example.

In one or more arrangements, the computing system 14 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations.

Communications interfaces 16 may be configured to allow interaction between the ground vehicle 11 and external sensors, other vehicles, other computer systems, various external messaging and communications systems (such as a satellite system or cellular phone/wireless communication system), a vehicle-mounted UAV (as described herein) and/or a user. The communications interfaces 16 may include a user interface for providing information to or receiving input from a user of the ground vehicle 11. For example, the communications interfaces 16 may include a voice/audio interface (not shown) (for example, a microphone and speaker for providing audio input and output), keypad, touch screen, and/or stylus through which a user of the computing system 14 may provide input, and may also include and a video display device (not shown) for providing textual, audiovisual and/or graphical output from the computing system. The computing system 14 may be configured to interpret or process any received audio input as a response to a query or an instruction for the computing system. The display can alternatively be any other suitable type of display. The display can be provided in any suitable location within the ground vehicle 11.

Computing system 14 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with computing system 14 may include devices installed in vehicles, mobile devices that may travel within vehicles, or devices outside of vehicles that are configured to receive and process vehicle- and/or UAV-related information.

The communications interfaces 16 may also include interfaces enabling communication in a wide area network (WAN), a wireless telecommunications network, and/or other communications networks. The communication network(s) can include wired communication links and/or wireless communication links. The communication network(s) can include any combination of the above networks and/or other types of networks. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s) and between the ground vehicle 11 and any nearby roadside communications nodes and/or infrastructure.

When used in a WAN networking environment, the computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information from various sources.

The communications interfaces may also include any interfaces 16a needed for communicating with a vehicle-mounted UAV, as described herein. A user may communicate with the UAV through an interface such as a vehicle mounted touch screen or via another wired or wireless interface (such as a cellular phone application, for example). One or more interfaces may also be provided to facilitate communication between computing system 14 and the UAV, so that information and/or instructions may be passed between the computing system and the UAV.

The ground vehicle 11 may also include various actuatable sub-systems and elements in operative communication with computing system 14 and other vehicle systems and/or components, and which are operable (at least to some degree) responsive to control commands received from the computing system. Various actuatable sub-systems and elements may be controlled manually or automatically (by computing system 14) depending on such factors as a given driving situation and/or whether autonomous driving assistance systems (for example, ACC 63 and/or lane keeping 64) are activated.

The ground vehicle 11 may be configured so that the computing system 14, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through another physical medium (such as wired connections) or the connections may be wireless connections.

Embodiments described herein relate to the deployment, operation, and docking of an unmanned aerial vehicle (or "UAV") deployable for increasing a range or distance over which the ground vehicle 11 is able to obtain information on its surrounding environment. Deployment of the UAV effectively extends the range of any one or more sensors, visual systems, and/or communications interfaces that may be onboard the ground vehicle 11.

Figure 2:
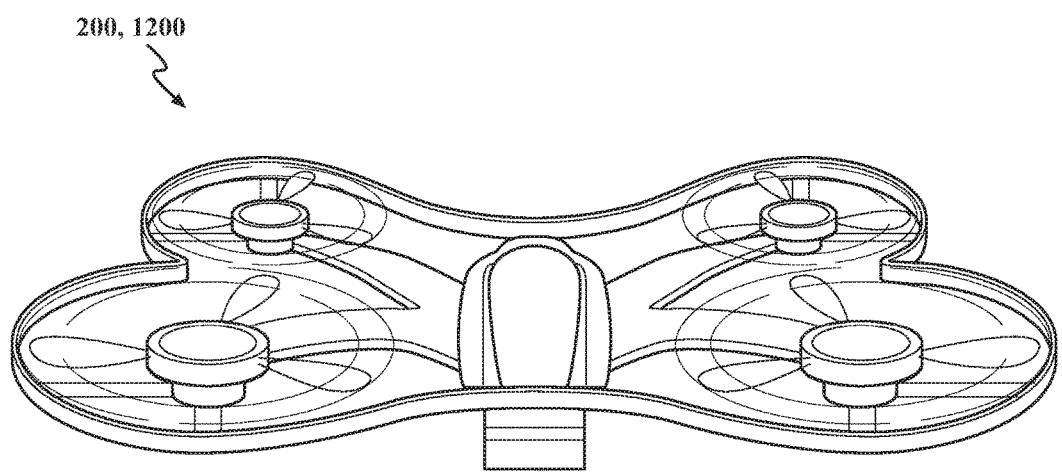
FIG. 2 is a perspective view of an exemplary unmanned aerial vehicle or UAV in accordance with an embodiment described herein.
Figure 3:
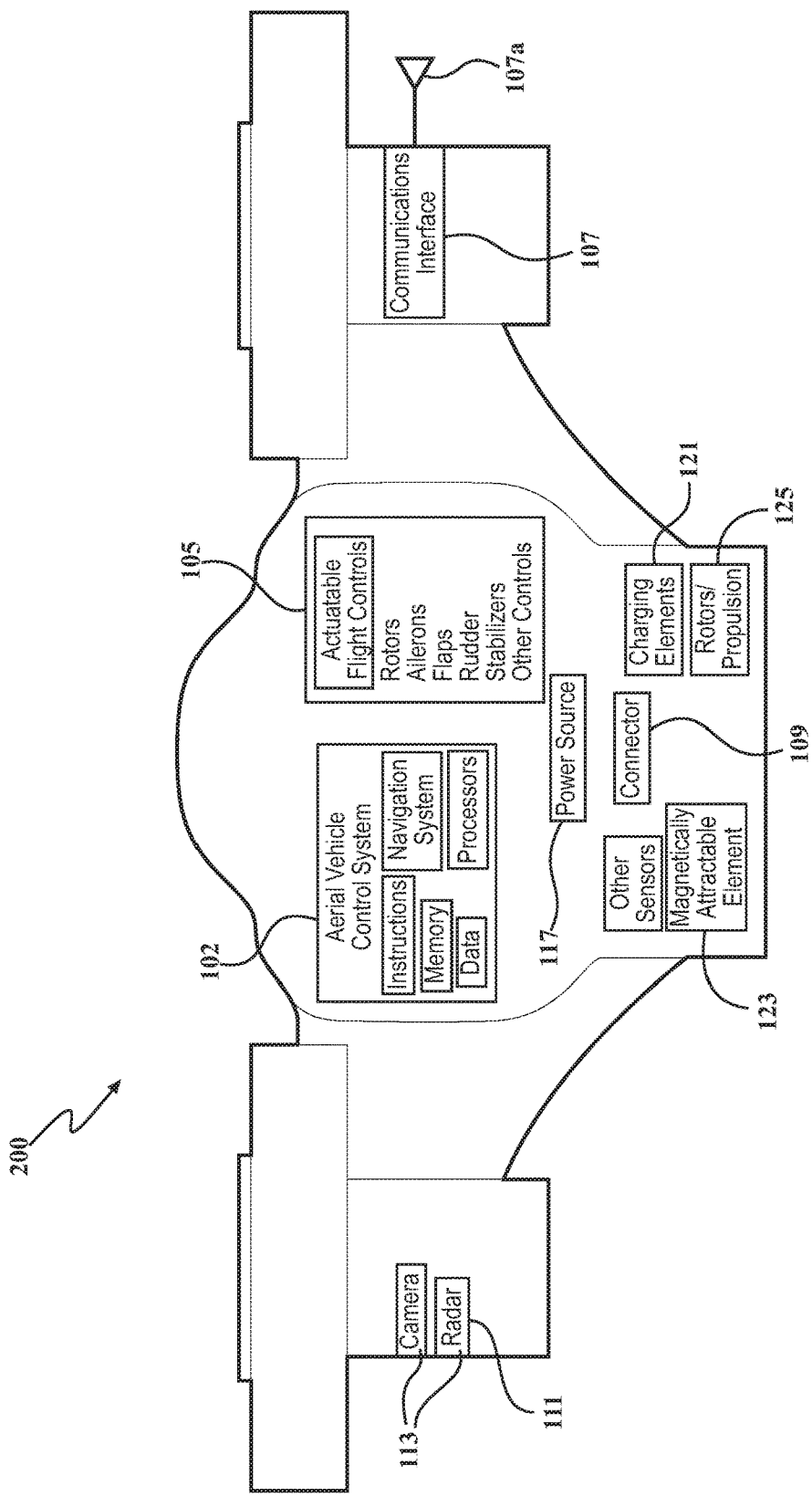
FIG. 3 is a block schematic diagram of a UAV in accordance with a particular embodiment described herein.
Figure 4:
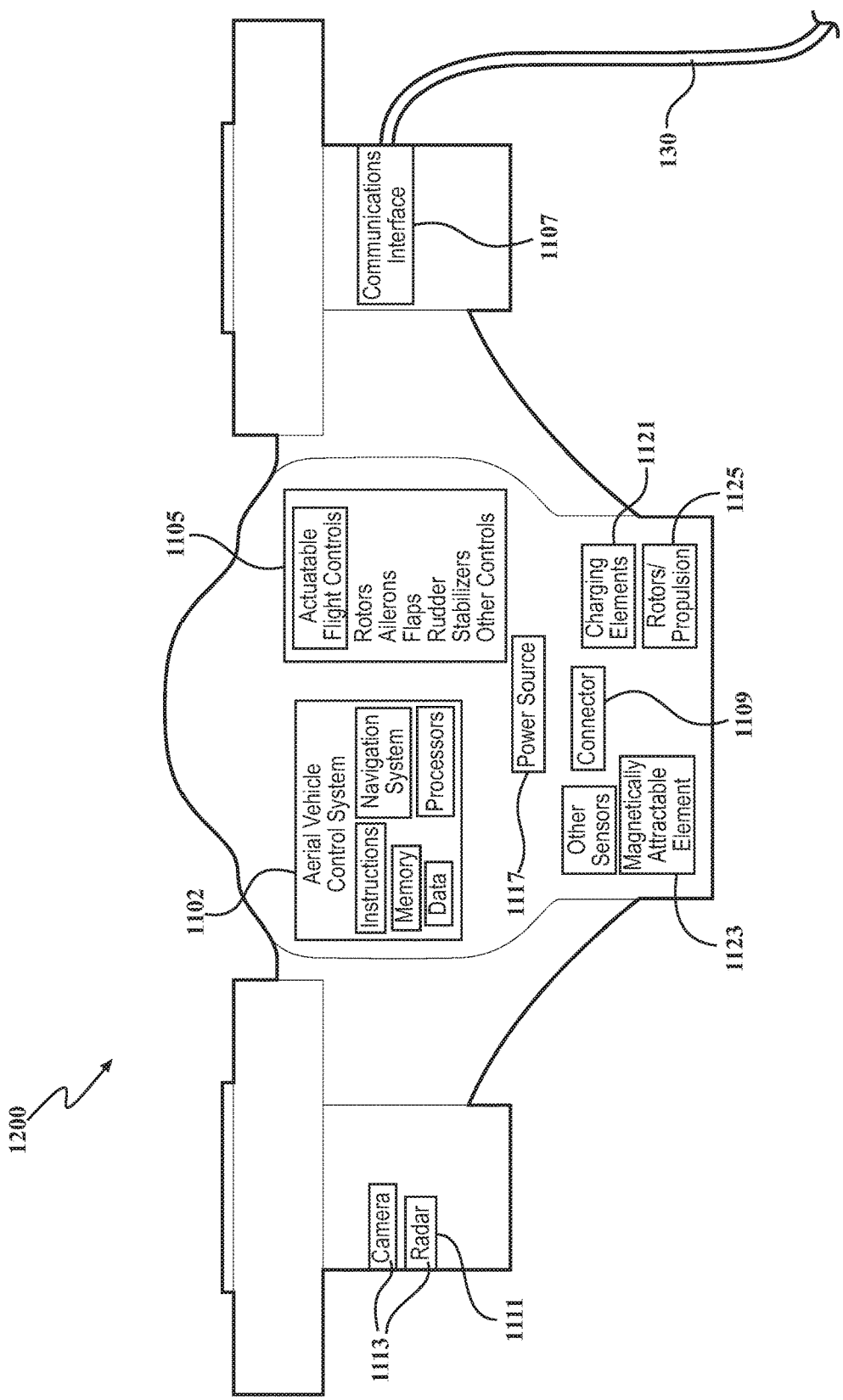
FIG. 4 is a block schematic diagram of a UAV in accordance with another particular embodiment described herein.

FIG. 2 is a perspective view of an exemplary UAV in accordance with an embodiment described herein. FIGS. 3 and 4 are schematic block diagrams of exemplary UAV's 200 and 1200 in accordance with embodiments described herein. The UAV's 200 and 1200 may be quadricopters (as shown in FIG. 2) or any other similar type of air travel-capable model. Further description on how the UAV's 200 and 1200 are operated to obtain additional information on the environment surrounding the ground vehicle 11 will be provided in more detail below.

The UAV's 200, 1200 may include one or more of the sensors and/or communications interfaces 16 found onboard the ground vehicle 11 and as described with reference to FIG. 1, to enable the UAV to communicate sensor and other information to the ground vehicle 11 and receive instructions and or other information from the ground vehicle. Unless otherwise noted, the following descriptions of UAV functions and capabilities will apply to all embodiments of the UAV (including embodiments 200, 1200, and other embodiments not shown). Also, unless otherwise noted, similar reference characters in FIGS. 3 and 4 will denote elements similar to both UAV embodiments.

The UAV embodiment 200 shown in FIG. 3 may be configured for self-directed flight at various altitudes and distances from the ground vehicle 11, with no connection to the ground vehicle 11 during flight other than via wireless communications. Flight commands controlling the UAV 200 may be generated by the aerial vehicle control system 102. Alternatively, referring to FIG. 9, commands may be received (via communications interface 107) from a source outside the UAV, such as ground vehicle 11 or a separate control station (such as station 73). Commands may also be received from both sources.

The UAV embodiment 1200 shown in FIG. 4 may be secured to the ground vehicle 11 by a tether 130 when in flight. The tether may be structured to enable the ground vehicle 11 to pull the UAV along through the air while the ground vehicle 11 is operating. The UAV 1200 may incorporate controllable lift surfaces (schematically represented in flight controls 1105) to aid in controlling the UAV altitude and in maneuvering the UAV. In addition, UAV altitude may be partially controlled by the UAV propulsion system.

The tether 130 may also be structured to incorporate one or more signal lines or power lines (not shown) extending between the ground vehicle 11 and the UAV 1200. The power line(s) may permit transmission of power from the ground vehicle 11 to the UAV for powering the UAV and/or for recharging a UAV power source 1117 which may power the UAV systems, including sensors 1113, control system 1102, flight controls 1105, communications interface 1107, and other systems. The signal line(s) may permit communications (for example, sensor data or UAV control commands) between the UAV and the ground vehicle 11. In an embodiment where the UAV 1200 is to be completely controlled from the ground vehicle 11 and/or from another entity (such as ground station 73), the aerial vehicle control system 1102 or (elements thereof) may be omitted.

Referring to FIGS. 3 and 4, flight controls 105 and 1105 may control actuatable systems and elements affecting aspects of UAV flight (such as altitude and direction), responsive to commands from the associated UAV control systems 102 and 1102. Such controls and elements may include rotors, ailerons, flaps, rudders, stabilizers, and any other elements and controls, depending on the design of the UAV.

Any UAV embodiment may incorporate an onboard aerial vehicle control system, such as control systems 102 and 1102. The control system may include elements similar to those found in ground vehicle 11 previously described, such as a navigation system or unit, one or more memories, stored instructions and data, one or more processors, and other elements. Control systems 102 and 1102 may have characteristics of ground-vehicle computing system 14 and may incorporate stored routines, instructions, algorithms, and the like, usable for controlling the UAV responsive to characteristics of a planned route for the ground-vehicle 11, data from sensors in the ground-vehicle or the aerial vehicle, driving conditions, and any other relevant information. The control systems may be configured to generate flight commands, generate, follow, and modify navigational plans, adjust the UAV flight path to avoid obstacles responsive to sensor readings and other information, and to perform a variety of other UAV control functions. The control systems may be configured to operate the UAV actuatable flight controls to effect maneuvering of the UAV to perform the functions described herein, and responsive to, for example, stored instructions, analysis of sensor data, and/or commands received from a source external to the UAV.

Figure 9:
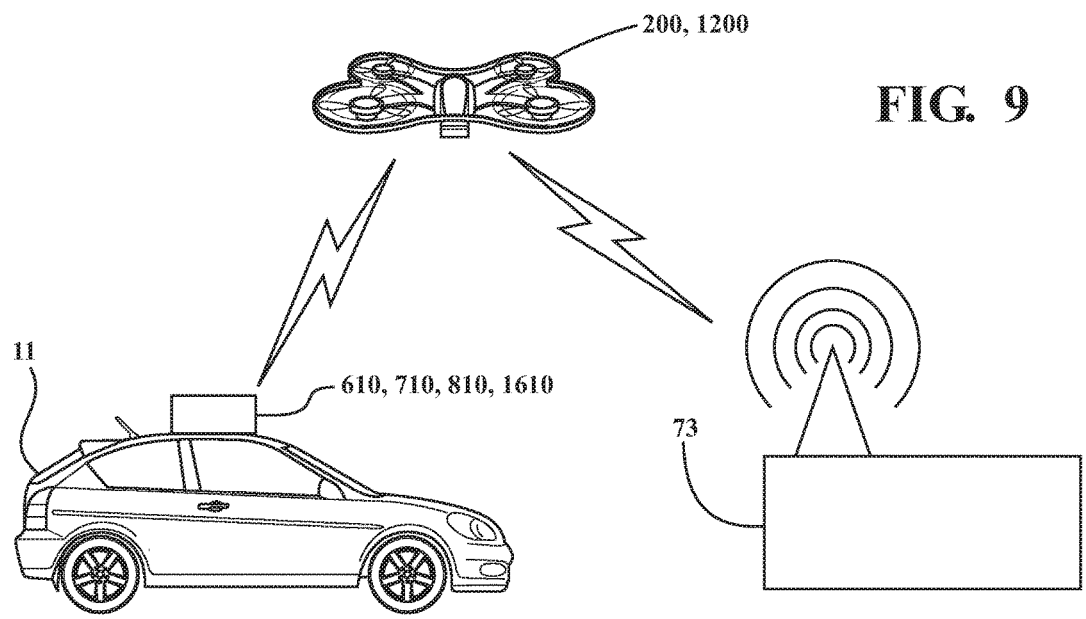
FIG. 9 is a schematic view of a UAV control arrangement in accordance with an embodiment described herein.

Any embodiment of the UAV may include communications interfaces (such as interfaces 107 and 1107 in UAVs 200 and 1200), which may be configured to enable and facilitate communications between the various UAV systems, the ground vehicle 11, and/or any other entity (for example, satellite systems or ground stations such as station 73 in FIG. 9). Any of the UAV communications interfaces may incorporate elements similar to those included in ground vehicle 11, as previously described. Additional elements may be provided is needed for the purposes described herein.

The UAV communications interfaces may be embodied in hardware circuits or circuitry that include and/or are operatively connected with one or more processors (e.g., microprocessors, controllers, or the like) and communication devices (e.g., wireless antennas 107a and/or wired connections (not shown)). These devices may be configured to operate as transmitters and/or transceivers for communicating signals to and from one or more locations. For example the UAV communications interface 107 may wirelessly communicate signals via the antenna 107a to a remote facility 73 (FIG. 9, to the ground vehicle 11, or the like. The communications interface 1107 may communicate signals to the vehicle 11 via tether 130.

The UAV communications interfaces may use time division multiplexing (TDM) or another multiplexing scheme, for example, to encode and wirelessly communicate camera image data or other data. Alternatively, another encoding technique may be used. The communications interfaces may, for example, include a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications. The UAV may be capable of maintaining communication with the ground vehicle 11 and/or with other entities while in both the deployed state and attached (or docked) state. In addition, the UAV communication interfaces may allow the ground vehicle 11 or other entities to update the UAV with information (such as current sensor data or software upgrades, for example) that may facilitate a safer and more efficient deployment and reattachment process for the UAV.

Any UAV embodiment may also incorporate one or more connectors (such as a known data connector) (represented by connectors 109, 1109) or other data transfer devices to enable communication of signals over a wired connection (e.g., a cable, bus, or wire such as a multiple unit cable, train line, or the like) when the UAV is docked. The signals may include sensor data (such as camera image data) or any other type of information relating to situations or conditions detected by the UAV, or UAV operational and/or status information. In certain embodiments, the connectors may also incorporate a power transfer capability, enabling an associated UAV power source to be recharged through the connector.

In certain embodiments, the UAV may incorporate sensor unit docking ports 111, 1111 configured to receive therein any of a variety of sensor modules 113. Sensor modules 113 may be configured to be pluggable into complementary interconnects or interfaces in the ports 111. This enables any of a variety of different types of sensors to be deployed via the UAV, depending on the requirements of a particular application. Examples of sensors which may be deployed include radar, camera, lidar, and other sensors. Alternatively (or in addition) to docking ports, various sensors may be permanently mounted in any given UAV.

A UAV-mounted camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. A data storage device for storing camera and image data, if present, may be a hard disc drive, flash memory (electronic non-volatile non-transitory computer storage medium), or the like.

Any embodiment of the UAV may include a power source (such as power sources 117 and 1117 shown in FIGS. 3 and 4, respectively) configured for powering the flight controls, sensors, communications, and other UAV systems. A suitable power source may be a rechargeable lithium-ion battery, a rechargeable Ni-Mh battery, an alkaline cell, or other device configured for portable energy storage for use in an electronic device.

An embodiments of the UAV may also incorporate induction charging elements (such as elements 121 and 1121, for example) operatively connected to the UAV power source and configured for charging the power source when the UAV is docked. In certain embodiments, the charging element is in the form of an induction coil configured to enable induction charging of the UAV power source through electrical coupling with an associated induction coil positioned in an embodiment of a UAV housing (described below).

An embodiment of the UAV may also incorporate a magnetically attractable element (such as elements 123 and 1123 in FIGS. 3 and 4) which may be attracted by a magnet in the UAV housing (described below) to position the UAV in a desired location. The magnet may also be used to maintain the UAV in the desired location until deployment.

Embodiments of the UAV may be configured to deploy from a moving ground vehicle 11 and to land on and dock with the ground vehicle (or in a housing secured to the moving ground vehicle). The UAV and/or the ground-vehicle may be configured to monitor aspects of driving conditions and ground vehicle surroundings to determine when it is safe for the UAV to deploy (i.e., leave its housing) after a deployment command has been issued.

Embodiments of the UAV may also be configured and controllable to, for example, automatically fly at a designated altitude above the ground vehicle; to automatically fly at a designated distance ahead of the ground vehicle and over a planned route of the ground vehicle; to automatically maintain a position relative to the ground vehicle; and to adjust its flight path so as to avoid detected or potential obstacles.

Embodiments of the UAV may also be configured and controllable to, for example, use UAV-mounted and/or vehicle-mounted sensors to determine a position of the ground vehicle 11 relative to the UAV; determine a position of the UAV relative to the ground vehicle; and to detect obstacles both along the route of the ground vehicle and along a flight path of the UAV. For example, the UAV may be configured to identify other vehicles, pedestrians, road blocks, curbs, potholes, downed trees, landslides, flooded roads, or other obstacles that may impede the ground vehicle 11 from traveling.

The UAV may be controllable to fly to a planned destination of the ground vehicle and gather information via any one or more of the onboard sensors, visual systems, or communications interfaces incorporated into the UAV. The UAV may also be controllable to fly to along a planned route of the ground vehicle. The vehicle may transmit information observed about the destination and/or the route of the ground vehicle back to the ground vehicle 11. The information transmitted back to the ground vehicle 11 may, for example, be digital images, live-streaming video, digital video clips, or sensed object information from one or more of the onboard sensors to the UAV. The information may then be processed by the computing system 14 and/or presented to a vehicle occupant by, for example, displaying on a display unit within the vehicle cabin (e.g., center consoles, heads up display, infotainment display, navigation display, etc.). The UAV may also have other capabilities necessary or useful for performing the various functions described herein.

Any embodiment of the UAV may be controlled manually from the ground-vehicle 11 using dedicated controls that may be used for inputting operational commands when the UAV is deployed, during deployment or detachment, during docking, and/or when the UAV is docked with the ground-vehicle. Alternatively, the UAV may be totally or partially automatically controlled by ground vehicle computing system 14 using stored routines, instructions, algorithms, and the like, and responsive to characteristics of a planned route for the ground vehicle, sensor data from the ground vehicle or the UAV, driving conditions, and/or any other relevant information. Alternatively, the UAV 200 may be totally or partially controlled by the aerial vehicle control system 102 located on the UAV itself. Embodiments of a UAV described herein may also be controllable remotely (for example, from a ground station such as ground station 73 in FIG. 9), and/or by a combination of the control mechanisms just described, if needed or desired for purposes of meeting various remote sensing needs or responding to situations which the UAV or the ground-vehicle 11 may encounter.

Computer control of the UAV 200 may be based on analysis and/or interpretation of sensor data gathered by the UAV, by the ground vehicle 11, or by another source. For example, images from cameras mounted on the UAV may be analyzed using one or more image processors (located either on the UAV or on the ground-vehicle). Appropriate UAV control commands may then be formulated or accessed based on results of the image analysis.

FIGS. 5A-8C show schematic diagrams of various embodiments of housings configured to transport and facilitate operation of ground vehicle-mountable UAV's. The housings are structured for transporting therein a UAV in accordance with an embodiment described herein. Any of the various UAV housings may be built onto the ground vehicle during vehicle assembly or fabrication, or the housing may be configured for retrofitting onto an existing vehicle. In a particular embodiment, any housing may be a separate or self-contained unit attachable to a luggage rack or similar structure on an existing vehicle. In particular embodiments, a UAV housing may be securable in the bed of a pickup truck. Other mounting options may also be used, depending on the structure of the vehicle on which the housing is to be mounted.

For purposes of description, a forward direction (labeled "M") refers to a direction in or toward a forward part of the ground vehicle 11, or a direction that the vehicle would take if it is moving forward. A rear or rearward direction (labeled "N") refers to a direction in or toward a rear part of the ground vehicle 11, or a direction that the vehicle would take if it is moving rearwardly.

Figure 5A:
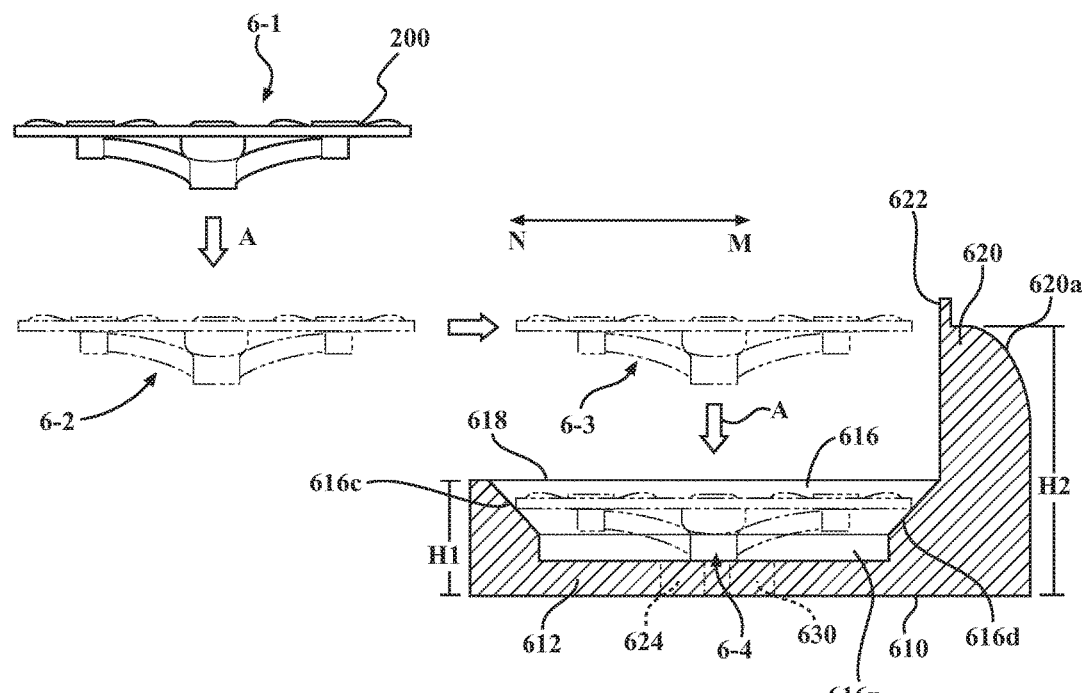
FIG. 5A is a schematic cross-sectional side view of an unmanned aerial vehicle housing in accordance with one embodiment described herein, also illustrating one embodiment of a docking procedure for an unmanned aerial vehicle.
Figure 5B:
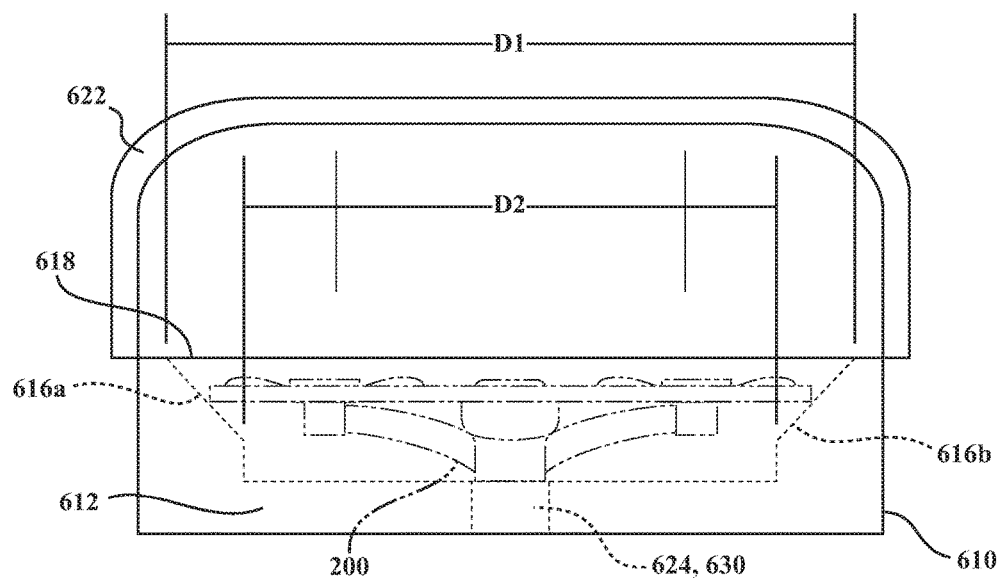
FIG. 5B is a schematic rear view of the unmanned aerial vehicle housing in FIG. 5A, showing a UAV in a docked position.

In the embodiment shown in FIGS. 5A-5C, UAV housing 610 includes a base portion 612 defining a cavity 616 and an opening 618 leading into the cavity. The walls of the cavity 616 may be configured to enclose and immobilize the UAV 200 when the UAV is docked with the ground vehicle 11, to aid in shielding the UAV 200 from wind damage and air turbulence during vehicle movement. The housing 610 may be mounted, for example, on a roof of a passenger car, in the bed of a pickup truck, or in any other suitable location on the ground vehicle. The cavity 616 and opening 618 may be located so as to reside along a top of the housing when the housing is mounted on the roof or in a truck bed of a ground vehicle. Thus, the cavity is configured so as to open upwardly when the housing is mounted on the ground vehicle 11. The cavity 616 may have a dimension D which narrows when proceeding from an exterior of the housing through the opening 618 in a direction "A" toward the base portion. For example, in the embodiment shown in FIGS. 5A-5C, at least one of the wall surfaces 616*a* defining the cavity 616 may taper inwardly (i.e., in a direction toward another wall surface 616*b* residing opposite the tapering wall 616*a*) when proceeding from an exterior of the housing through the opening 618 in a direction toward the base portion 612. In the embodiment shown in FIGS. 5A-5C, the dimension D narrows from D1 near an entrance to the opening 618, to D2 at a location closer to the housing base 612.

In the embodiment shown in FIGS. 5A-5C, the cavity 616 is defined by two sets of opposed wall surfaces 616*a*, 616*b* and 616*c*, 616*d*, all of which have portions that taper inwardly when proceeding in a direction "A" toward the base portion 612. However, other embodiments may have fewer or more tapering walls, depending on the shape of the cavity defined by the walls and other pertinent factors.

The portion 616*p* of the cavity 616 adjacent the base portion 612 (i.e., the bottom portion of the cavity 616 in a housing mounted on a roof or truck bed of a ground vehicle, for example) may be dimensioned to accommodate a portion of the UAV which rests on the base portion 612 when the UAV is docked. Also, the walls 616*a*-616*d* defining the cavity and the walls defining the bottom portion 616*p* of the cavity may be contoured or shaped so as to correspond to the shapes of outer surfaces of the UAV positioned within these portions of the cavity.

The tapered and contoured configurations of the cavity walls may aid in directing the UAV to a desired position within the cavity under the influence of gravity or magnetic attraction by a magnet positioned in the housing base 612. This configuration of the cavity walls may also aid in securing and immobilizing the UAV within the housing 610 between deployments. In particular embodiments, the tapering and shaping of the cavity walls may also aid in aligning or locating the UAV with respect to specific features in the housing as the UAV moves deeper into the cavity 616. Such features may include one or more electrical connectors and induction charging elements positioned in the base. The walls may be configured and the housing features positioned so that when the UAV contacts the base portion 612, connectors in the UAV will mate with complementary connectors in the base portion and/or induction charging elements in the UAV 200 and base portion 612 will be aligned.

The walls of the cavity 616 may be configured according to a particular UAV design, to enable the walls to direct or "funnel" the UAV toward a particular location within the housing. In addition, the tapering of one or more of the housing walls may be used to force or bias the UAV into a position in the cavity where a magnetically attractable element on the UAV is in alignment with (and spaced apart a relatively short distance from) an electromagnet in the UAV base portion 612, prior to energization of the magnet to draw the UAV into contact with the base portion. This enables the size of the electromagnet to be minimized while helping to ensure the ability quickly and reliably to attract the UAV.

Referring again to FIGS. 5A-5C, a drafting wall 620 is structured to extend from the base portion 612 at a location forward of at least a portion of the cavity 616 when the housing 610 is mounted on the ground vehicle 11. A forward-facing portion 620*a* of the wall 620 may be streamlined or otherwise shaped to enhance aerodynamic efficiency when the vehicle is traveling. Wall 620 is structured to enable drafting of the UAV behind the wall when the UAV is in the process of deploying from the housing and in then process of docking with the housing. Thus, the height H1 of the cavity walls and the height H2 of wall 620 may be specified in relation to each other so as to enable the UAV to draft behind the wall 620 while flying above the cavity opening 618. The ability to draft behind wall 620 enables the UAV 200 to match the current speed of the ground vehicle 11 just after exiting the cavity and prior to full deployment. The ability to draft behind wall 620 may also reduce wind resistance during docking of the UAV into the housing. The relative heights of the various walls may be optimized for the requirements of a given UAV design and its operational characteristics. In addition, a lip 622 may extend along a rear edge of the wall 620 for interrupting airflow past the wall 620 during movement of the ground vehicle 11. The wall 620 and the lip 622 may aid in reducing air resistance encountered by the UAV when deploying from the housing and during docking with the housing.

An induction UAV charging mechanism 624 (for example, a suitable coil and associated circuitry) may be provided in housing base 612. The charging mechanism 624 may be positioned to electrically align and couple with a one or more induction charging elements 121, 1121 positioned in UAV's 200 and 1200, as shown in FIGS. 3 and 4. The charging elements are electrically coupled to (and provide a mechanism for charging) an associated UAV power source 117, 1117. In this configuration, when the UAV is in a docked condition, the UAV power supply may be recharged using known induction charging methods.

In another embodiment, the UAV charging mechanism may be in the form of an electrical connector (such as a known power connector) (not shown) which may be electrically coupled to a ground vehicle power source, such as the vehicle battery or a UAV housing power interface 11*p* powered by the ground vehicle 11. The connector may be configured to be electrically mateable with a complementary electrical connector (such as connector 109 or connector 1109) positioned on the UAV, and which is electrically coupled to an associated UAV power supply. The connector may be positioned so that when the UAV is in a docked condition, the UAV and housing connectors are mated, thereby enabling charging of the UAV power supply using vehicle power. For example, the housing connector may project from the base or be recessed into the base so as to be accessible by the mating connector on the UAV. The connectors may also incorporate a data transfer capability so that data or other information may be transferred to and/or from the UAV when the UAV is docked.

An electromagnet 630 may be positioned in the base portion 612. The electromagnet 630 may be electrically coupled to the ground vehicle housing power interface 11*p*, which may power the electromagnet when the magnet is activated. The magnet 630 is positioned and configured to (when activated) magnetically attract a magnetically attractable element or feature (such as feature 123 of the UAV 200 or feature 1123 of UAV 1200) so as to draw or force the UAV into contact with the housing base 612. The magnet may be turned off when the UAV 200 is docked and/or when the UAV is being deployed.

If desirable, docking sensors may be incorporated into the UAV housing 610 (for example, sensors 631) and/or into the UAV, to facilitate docking. The sensors may provide data to the vehicle and UAV computing systems which may be used by the computing systems to make fine adjustments to the positions of the UAV 200 and/or ground vehicle 11 to facilitate docking.

The housing 610 may also include a vehicle power interface (not shown) which may include any connectors, circuitry, transformers, or any other elements needed for receiving power from the ground vehicle 11 and converting and/or transferring the vehicle power to the housing, so as to power the electromagnet, UAV charging mechanism, and any other powered features and/or functions of the housing. A suitable power cable (not shown) may be provided for electrically coupling a power source (such as the engine or battery) on the ground vehicle to the vehicle power interface.

FIG. 5A illustrates a procedure for docking the UAV 200 with housing 610. All UAV locations are shown and described as relative to the ground vehicle 11 while the vehicle is moving. To aid in preventing damage to the UAV and/or housing during any of the docking and deployment scenarios described herein, it may be desirable for the ground vehicle 11 to travel at a steady speed until the UAV is docked within a housing cavity as described herein, or until the UAV has ascended to an altitude above the UAV housing during deployment. In addition, prior to docking or deployment, a UAV or ground vehicle computing system may (in communication with UAV and/or ground vehicle sensors) determine if conditions are safe to deploy or dock the UAV. For example, if the ground vehicle 11 is passing under a bridge or underpass when the docking or deployment command is given, the docking or deployment may be delayed until the ground vehicle emerges from under the bridge or underpass. In addition, the UAV or ground vehicle computing system may be configured to estimate a length of time that the vehicle may continue to travel at a steady speed, and compare this with estimated time needed for the UAV to deploy or dock. If the estimated amount of time available to dock or deploy the UAV is deemed insufficient, the docking or deployment may be delayed until the vehicle speed can be stabilized for a sufficient time period.

Referring to FIG. 5A, in the UAV location 6-1, the UAV 200 is approaching the housing 610 for docking and matching the speed of the ground vehicle 11 on which the housing 610 is mounted. The UAV maneuvers in direction "A" to a drafting position 6-2 behind the wall 620. Movement of the UAV in the position 6-2 and positions at the same altitude forward of position 6-2 aid in protecting the UAV from wind, and in breaking up the airflow resulting from forward motion of the UAV and impinging on the UAV during flight. While drafting behind wall 620, the UAV maneuvers in direction "M" to a position 6-3 residing over the housing cavity 616. The UAV 200 may then descend in direction "A" to a location within the cavity 616, at which point power to the UAV propulsion units may be cut. While the UAV 200 is descending into the cavity 616, the housing electromagnet 630 may be powered to attract the UAV magnetically attractable element 123, thereby assisting the UAV in making contact with the housing as soon as possible. Position 6-4 shows the docked position of the UAV 200. FIG. 5B is a cross-sectional end view of the rear of housing 610, showing the UAV 200 in a docked position. FIG. 5C is a plan view of the rear of housing 610, showing the UAV 200 in the docked position.

If desired, the walls extending around the exterior sides and/or rear of the cavity 616 may be extended or elevated to aid in trapping or catching the UAV during descent. Raising of the rear wall portion may entail raising the front wall 620 a corresponding amount so that the UAV may still draft behind the wall while approaching the cavity.

To deploy from the housing 610, after safe deployment conditions are detected, the UAV 200 may power up its rotors or propulsion system and gradually rise out of cavity 616 while drafting behind front wall 620 and matching the speed of vehicle 11. The UAV may then rise from behind wall 620, increasing altitude and maneuvering so as to assume a deployed position.

Figure 6B:
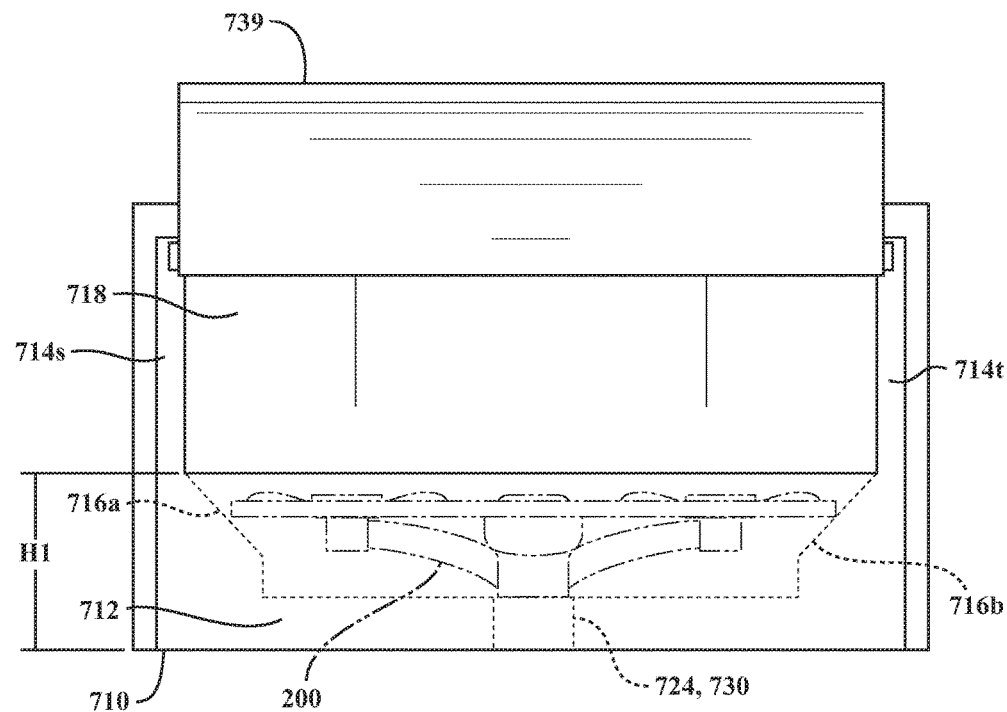
FIG. 6B is a schematic rear view of the unmanned aerial vehicle housing in FIG. 6A, showing a UAV in a docked position.
Figure 6C:
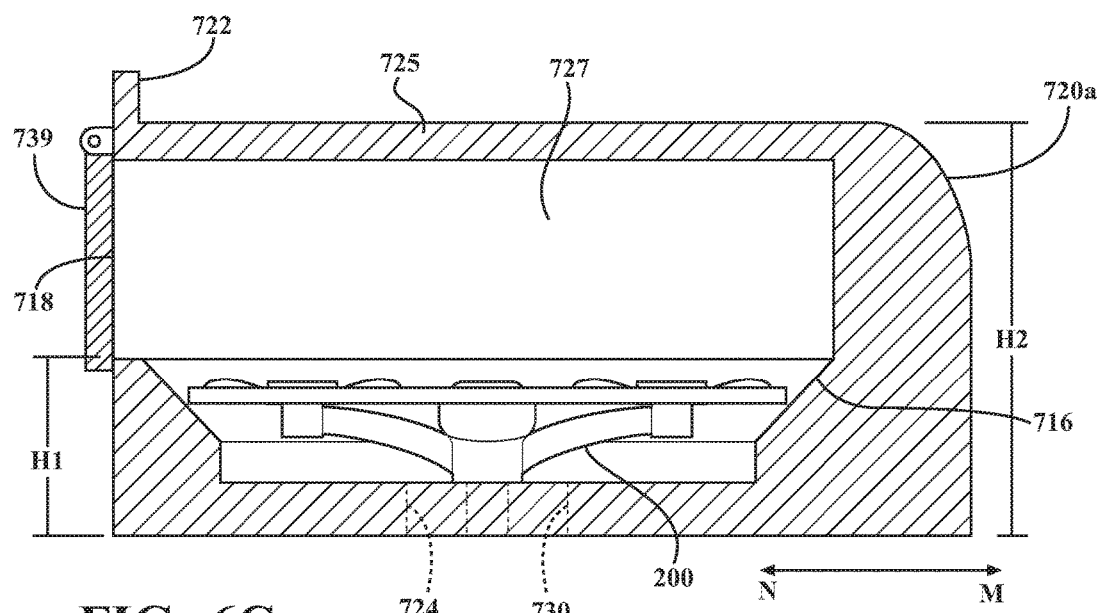
FIG. 6C is the side view of FIG. 6A showing an unmanned aerial vehicle in a docked position inside the housing.

Referring to FIGS. 6A-6C, in another embodiment 710 of the housing, an opening 718 is formed in a wall or portion of the housing structured to face toward the rear of the ground vehicle 11 when the housing is mounted on the vehicle. This rear opening 718 is structured to enable access from the exterior of the housing through the opening into an enclosure 727 formed in the housing 710. In this embodiment, the UAV 200 may use the opening 718 as a deployment or exit port and also as a docking or entry port, in a manner described herein. Housing 710 has a front-facing wall 720 similar to the wall 620 shown in FIGS. 5A-5C, and which is structured to extend from the base portion at a location forward of at least a portion of a housing cavity 716 when the housing is mounted on the ground vehicle. In this embodiment, opposed side walls 714*s* and 714*t* extend from the base 712 up opposite sides of the housing (i.e., sides residing along left and right sides of the vehicle when the housing is mounted on the vehicle).

Walls 714*s* and 714*t* intersect front wall 720. The height H2 of the front wall 720 and the side walls 714*s* and 714*t* may be specified to as to allow sufficient room for the UAV to maneuver from the housing exterior into the housing interior while drafting behind wall 720.

Housing 710 also has a top wall or roof 725 extending over the housing cavity 716 and between walls 714*s* and 714*t*. Walls 714*s* and 714*t*, roof 725, and front wall 720 combine to define enclosure 727 into which the UAV 200 may fly prior to descent into cavity 716. The enclosure 727 also serves to protect the UAV against adverse weather conditions. A rear door 739 may be provided to close the opening 718. Rear door 739 may be controlled by the computing system 14, automatically responsive to signals from sensors configured for detecting the presence and/or absence of the UAV within the housing, and/or manually from the vehicle passenger compartment.

FIG. 6A illustrates a procedure for docking the UAV 200 with housing 710. In the position 7-1, the UAV 200 is approaching the housing 710 for docking and matching the speed of the ground vehicle 11 on which the housing 710 is mounted. After safe docking conditions are detected, the UAV maneuvers in direction "A" to a drafting position 7-2 behind the wall 720. The position 7-2 and positions at the same altitude forward of position 7-2 aid in protecting the UAV from wind and in breaking up the airflow resulting from forward motion of the UAV. While drafting behind wall 720, the UAV maneuvers in direction "M" from the exterior of the housing 710, through the opening 718 and into the housing enclosure 727. At any time after the UAV 200 enters the enclosure 27, the rear door 739 may be closed. The UAV 200 may descend to a location within the cavity 716, at which point power to the UAV propulsion units may be cut. When the UAV 200 is descending into the cavity 716, the housing electromagnet 730 may be powered to attract the UAV magnetically attractable element 123, thereby assisting the UAV in making contact with the housing as soon as possible. Position 7-4 is the docked position of the UAV 200. FIG. 6B is an end view of the rear of housing 710, showing the UAV 200 in the docked position. FIG. 6C is a cross-sectional side view of the housing 710, showing the UAV 200 in the docked position, with rear door 739 closed.

To deploy from the housing 710, after safe deployment conditions are detected, the rear door 739 may be opened. The UAV 200 may also power up its rotors or propulsion system and gradually rise out of cavity 716. The UAV may then exit the rear opening 718 and maneuver to deploy.

Figure 7:
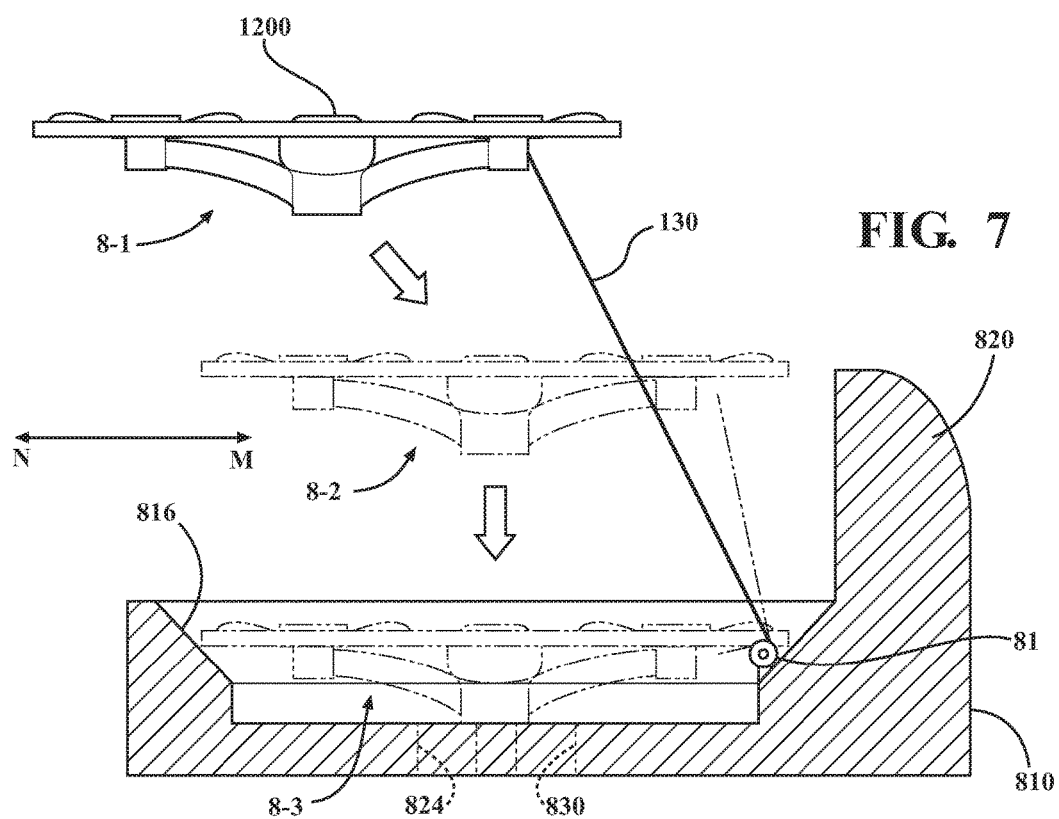
FIG. 7 is a schematic cross-sectional side view of an unmanned aerial vehicle housing in accordance with another embodiment described herein, and also illustrating another embodiment of a docking procedure for an unmanned aerial vehicle.

FIG. 7 is a schematic view showing docking of a UAV 1200 configured to be tethered to the ground vehicle 11 during deployment. The UAV 1200 is connected to an embodiment 810 of the housing via a tether 130 which is attached to a powered winch mechanism 81 positioned within the housing. The winch mechanism 81 may be powered by the ground vehicle 11 and may be controlled by commands from the UAV 1200 and/or the ground vehicle 11. The UAV housing 810 may otherwise be similar to the housing 610 shown in FIGS. 5A-5C.

During deployment of the UAV 1200, the position of the UAV in relation to ground vehicle 11 will be limited by the extended length of the tether 130. The UAV propulsion system and flight controls may be operated to adjust the altitude of the UAV and the lateral position of the UAV in relation to the ground vehicle 11. Vehicle and/or UAV sensors may provide data relating to potential obstacles in the path of the UAV. For example, features such as underpasses, bridges, trees, power lines, etc. along the vehicle route may pose a risk of damage to the UAV. The UAV control system 1102 and/or the ground vehicle computing system 14 (if configured to exercise UAV control) may be configured to control the UAV and/or the winch mechanism 81 so as to avoid such obstacles when detected. For example, if it is determined that the ground vehicle 11 is approaching an underpass, the UAV flight controls and propulsion may be operated to reduce altitude. Alternatively (or additionally), the winch mechanism 81 may be operated to reel in or retract the tether 130, thereby bringing the UAV closer to the ground vehicle 11. In a particular embodiment, the UAV 1200 may be controlled so as not to exceed a predetermined maximum altitude (for example 12 feet), so as to avoid underpasses or bridges. If the obstacles are deemed to be too numerous in the current travel area or cannot be avoided, the UAV may be docked.

The UAV 1200 may be docked with housing 810 by operating the winch mechanism 81 to gradually retract or wind up the tether, while the UAV controls propulsion power and operates the UAV control surfaces so as to maintain a stable position over the housing as the UAV descends into the cavity 816. The housing front wall 820 may also facilitate stabilization of the UAV position during docking by reducing wind resistance. The UAV 1200 may be deployed from housing 810 by operating the winch to gradually extend the tether, while the UAV exerts propulsion power against the tether and operates the UAV control surfaces so as to rise from the housing.

In particular embodiments, the UAV 1200 may be docked by maneuvering itself toward the housing as previously described and with slack in the tether (i.e., with the only tension in the tether being due such factors as the weight of the tether, wind forces, etc.). In these embodiments, the winch mechanism 81 may be operated to gradually reel in the tether as the UAV approaches the ground vehicle, responsive to a detected distance between the ground vehicle and the UAV. In this manner, some degree of slack in the tether may be maintained during the docking procedure. In these embodiments, the UAV control system may control the UAV in flight so as to compensate for the weight of the cable and any external forces (such as wind) exerted on the cable. In the same manner, the winch mechanism 81 may be operated during deployment of the UAV from the housing, to attempt to maintain a level of slack in the tether during the deployment process. These procedures may serve to remove or minimize reliance on the tether for the execution of deployment and docking maneuvers.

Figure 8A:
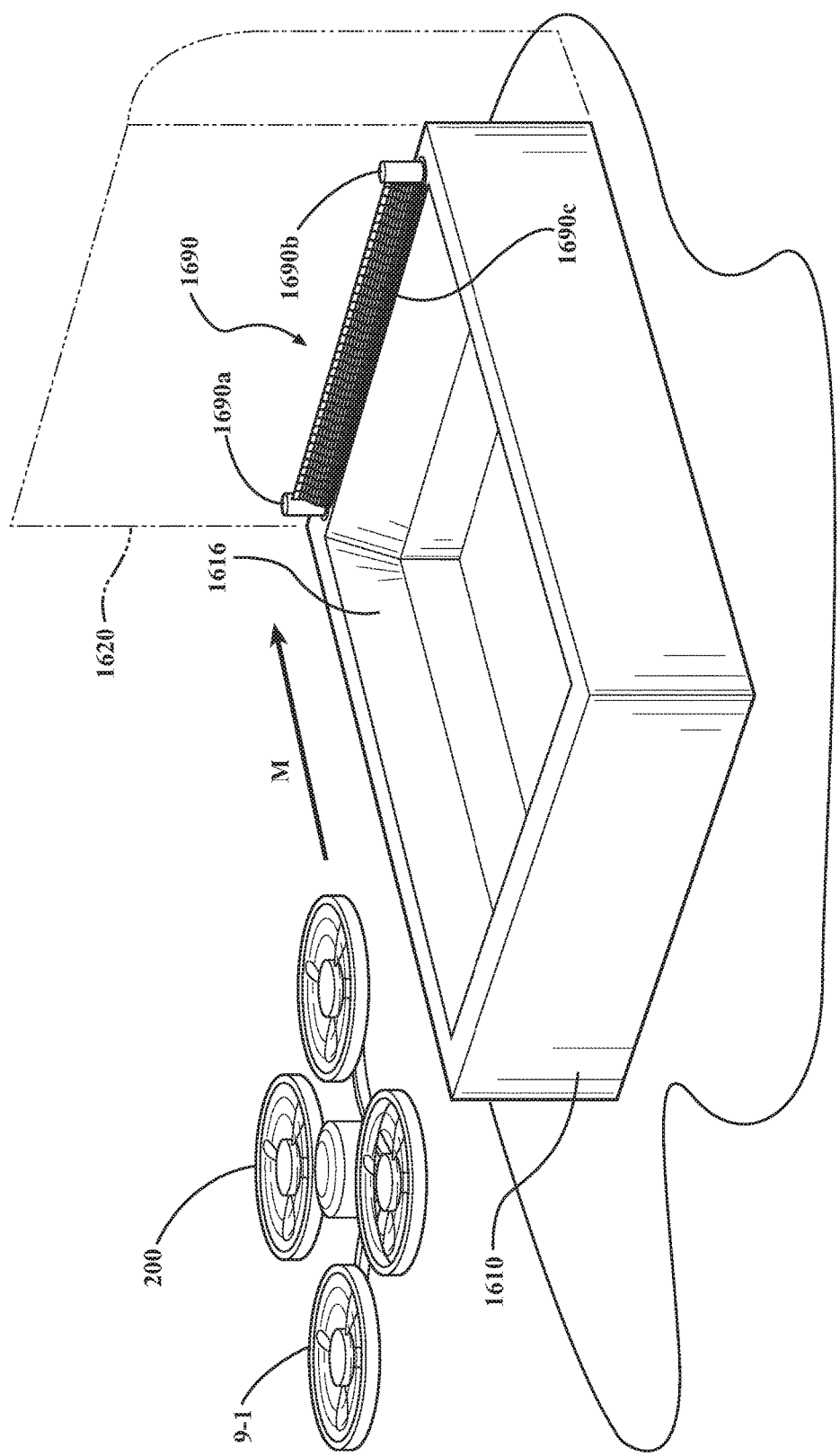
FIGS. 8A-8C are schematic perspective views of an unmanned aerial vehicle housing in accordance with another embodiment described herein, and also illustrating an embodiment of a UAV catching procedure.
Figure 8B:
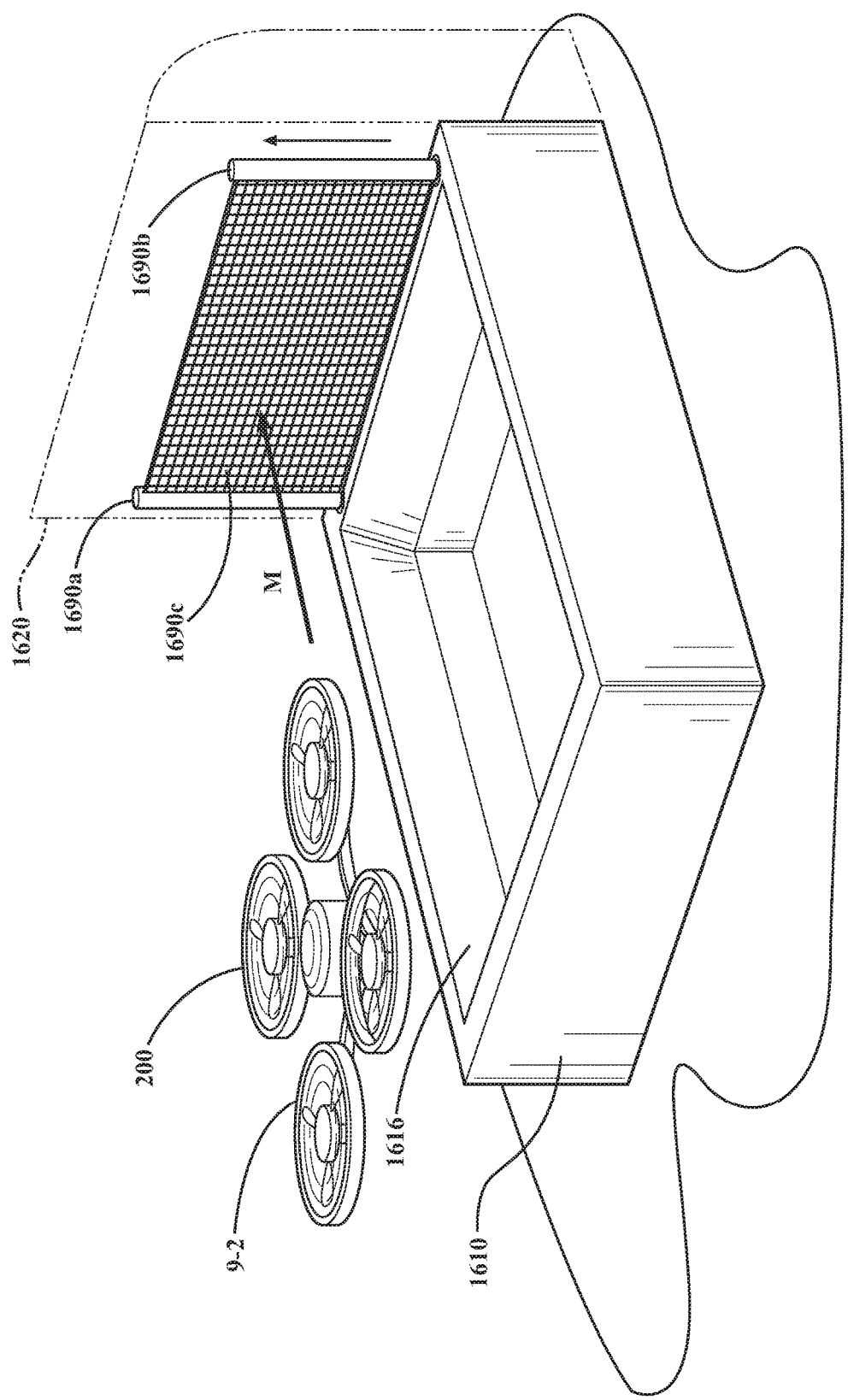
Figure 8C:
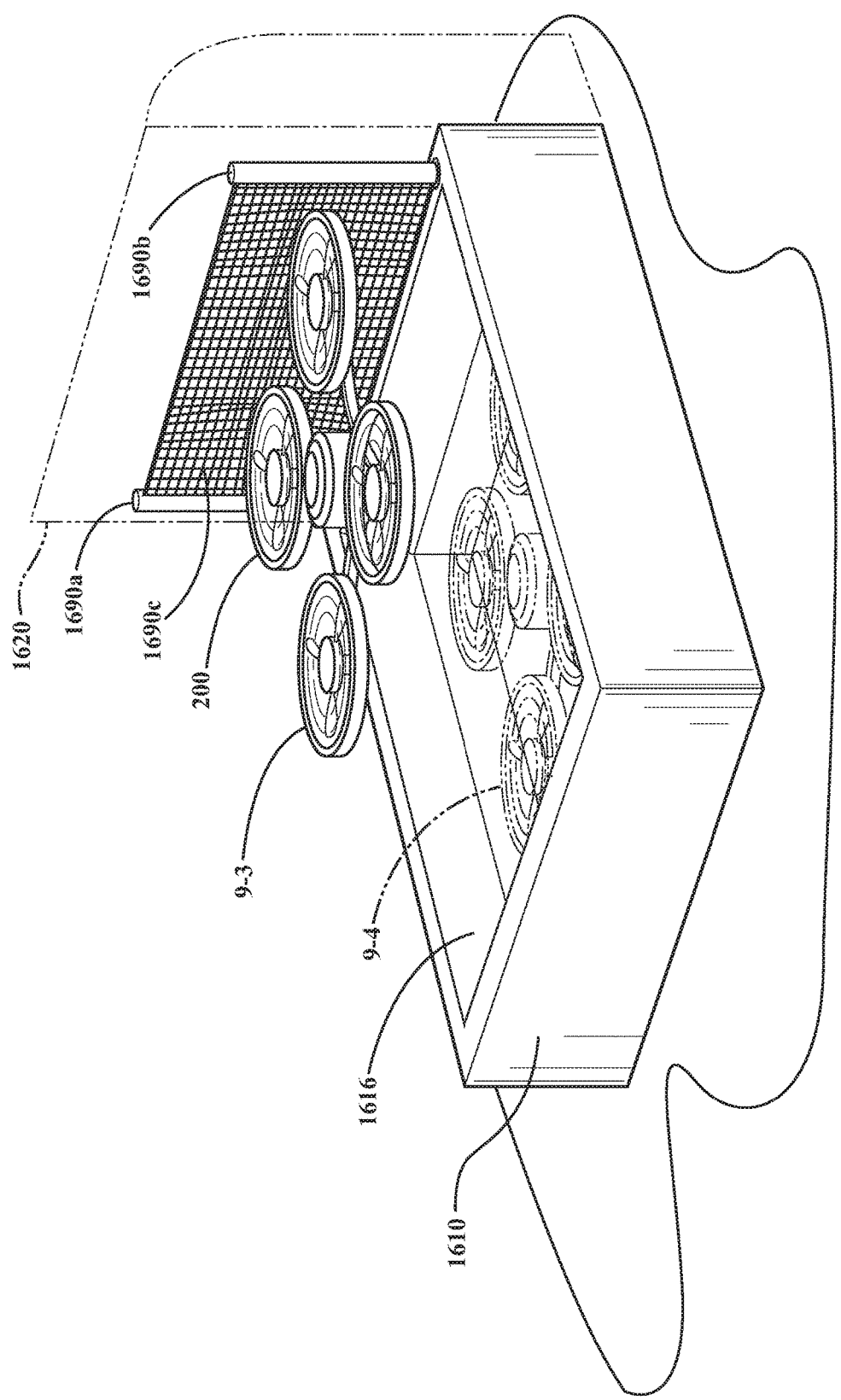

FIGS. 8A-8C show another embodiment 1610 of a UAV housing similar to the embodiment 610 shown in FIGS. 5A-5C. In this embodiment, space is provided between the housing cavity 1616 and the front drafting wall 1620 to permit a UAV catcher assembly 1690 to be incorporated into the housing.

In one embodiment, the catcher assembly may include a pair of spaced apart posts 1690a and 1690b, and a catching member 1690c secured to and suspendable between the posts. The catching member may be in the form of a suitable net or mesh material. Each of posts 1690a and 1690b may be mounted in an associated one of the left and right housing sidewalls. The catching member 1690c may be stretched taut enough between the posts to prevent the net from intruding into the cavity 1616 and interfering with motion of the UAV into or out of the cavity. The catching member may also be resiliently flexible enough to enable it to deflect to absorb the energy of the UAV impacting the catching member.

In one embodiment, the posts and the catching member remain in a deployed or raised configuration prepared to stop a forward-moving UAV as shown in FIG. 8B. In a particular embodiment, the posts 1690a and 1690b may be telescoping or otherwise operable to extend from and retract into the housing 1610, for example, by one or more motors (not shown) positioned in the housing for this purpose. When the posts are retracted, the catching member may reside in a folded configuration along an upper surface of the housing, as shown in FIG. 8A. When the posts are extended, the catching member may deploy to a configuration adapted for catching a UAV moving forward so as to impinge on the catching member.

FIGS. 8A-8C illustrate operation of one embodiment of the UAV catching assembly. In FIG. 8A, the UAV 200 is in a drafting position 9-1 behind front drafting wall 1620 and is approaching the wall. The posts 1690a and 1690b may be retracted. In FIG. 8B, as the UAV approaches to a position 9-2 within a certain distance of the wall 1620, the posts 1690a and 1690b are extended, thereby raising the catching member 1690c into a UAV-catching position. FIG. 8C shows the UAV 200 in position 9-3 impacting the catching member 1690c. After the UAV impacts the catching member and the UAV propulsion mechanism has been shut down, the UAV may drop into the cavity 1616 and into its docked position 9-4.

In another embodiment, the front wall 1620 may be hollowed out to permit the forward edge of the cavity 1616 and the UAV catching assembly 1690 to be brought farther forward. Sufficient space may then be available for the UAV catching assembly 1690 to be located within the front drafting wall 1620. This enables the overall length of the housing 1610 to be slightly reduced.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

In the following detailed description, reference is made to the accompanying figures, which form a part hereof In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A housing for an unmanned aerial vehicle, the housing comprising:
    a base portion defining a cavity, the cavity being structured to receive the unmanned aerial vehicle therein in a docked position, the cavity opening upwardly when the housing is mounted on a ground vehicle;
    a drafting wall structured to extend from the base portion at a location forward of at least a portion of the cavity when the housing is mounted on the ground vehicle; and
    an unmanned aerial vehicle catcher assembly structured to stop a moving unmanned aerial vehicle impacting the catcher assembly, the catcher assembly being positioned between the drafting wall and the cavity such that the moving unmanned aerial vehicle will drop directly into the docked position in the cavity after impacting the catching assembly,
    wherein the catcher assembly includes a first post mounted along a first side of the housing, a second post mounted along a second side of the housing opposite the first side, and a catching member having a first end attached to the first post and a second end attached to the second post, the catching member extending between the first post and the second post for catching the unmanned aerial vehicle in the catching member between the first post and the second post,
    wherein the drafting wall is hollowed out adjacent the cavity, and wherein the unmanned aerial vehicle catcher assembly is positioned within the hollowed out portion of the drafting wall, and
    wherein the first and second posts are extendable from and retractable into the housing.

2. The housing of claim 1, wherein the drafting wall has a portion structured to face in a forward direction of the ground vehicle when the housing is mounted on the ground vehicle, and a lip extending along a rear edge of the drafting wall so as to form a non-zero angle between the forward-facing portion and the lip.

3. The housing of claim 1, wherein the cavity has a dimension which narrows when proceeding from an exterior of the housing through the opening in a direction toward the base portion.

4. The housing of claim 1, further comprising an electromagnet positioned in the base portion.

5. The housing of claim 1, further comprising a charging mechanism for charging an unmanned aerial vehicle power source.

6. The housing of claim 5, wherein the charging mechanism comprises an induction coil.

7. The housing of claim 1, wherein the cavity includes at least one wall surface which tapers inwardly when proceeding from an exterior of the housing through the opening in a direction toward the base portion.

8. The housing of claim 1, further comprising a powered winch configured for controlling an extended length of a tether structured to connect the unmanned aerial vehicle to the housing.

9. The housing of claim 1, wherein the drafting wall is hollowed out adjacent the cavity, and wherein the unmanned aerial vehicle catcher assembly is positioned within the hollowed out portion of the drafting wall.

* * * * *